United States Patent [19]
Wallace

[11] 4,096,937
[45] Jun. 27, 1978

[54] ARTICLE TRANSPORT SYSTEM

[75] Inventor: Sydney Johnstone Wallace, Point Roberts, Wash.

[73] Assignee: American Can Company, Greenwich, Conn.

[21] Appl. No.: 764,451

[22] Filed: Jan. 31, 1977

Related U.S. Application Data

[63] Continuation of Ser. No. 622,092, Oct. 14, 1975, abandoned.

[51] Int. Cl.² .................... B65G 17/32; B65G 29/00; B65G 47/24; B65G 47/84
[52] U.S. Cl. .................................. 198/377; 198/651; 198/779
[58] Field of Search ............... 198/377, 779, 782, 789, 198/776, 651; 74/231 R, 231 J, 231 M

[56] References Cited

U.S. PATENT DOCUMENTS

| 426,890 | 4/1890 | Westphal | 198/181 X |
| 734,068 | 7/1903 | Ingle | 74/231 R |
| 2,177,982 | 10/1939 | Hannon | 198/131 UX |
| 2,696,978 | 12/1954 | Siegel | 198/183 X |
| 3,842,973 | 10/1974 | Rothert | 198/377 |

*Primary Examiner*—Evon C. Blunk
*Assistant Examiner*—Douglas D. Watts
*Attorney, Agent, or Firm*—Robert P. Auber; Ira S. Dorman; Harry W. Hargis, III

[57] ABSTRACT

An article transport system employs a rail assembly and a holder rotatably mounted on a conveyor. The assembly is comprised of a series of interconnected, axially-aligned, generally cylindrical members, which are relatively free to move independently of one another. Relative movement of the holder and rail assembly causes, through frictional engagement therebetween, the uniform rotation of an article mounted on the holder; the system has particular utility for transporting decorated can shells through ultraviolet curing ovens.

3 Claims, 3 Drawing Figures

U.S. Patent    June 27, 1978    4,096,937
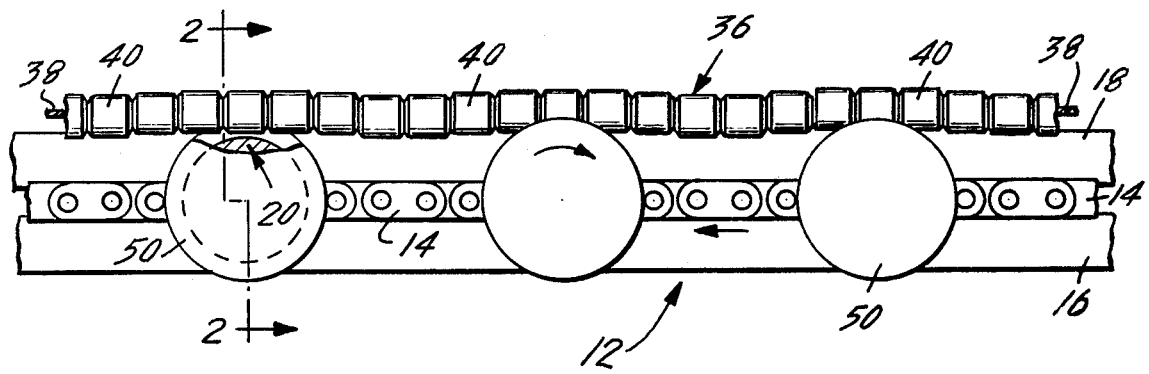
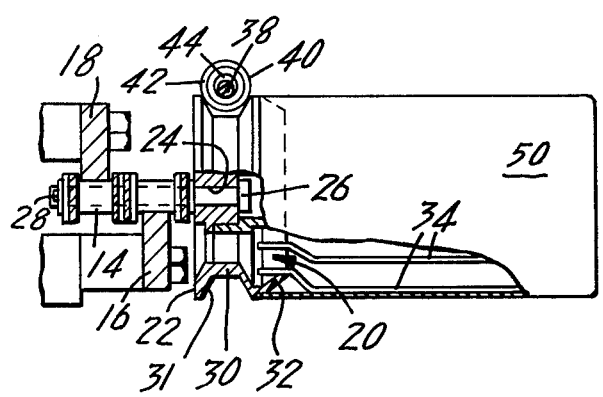
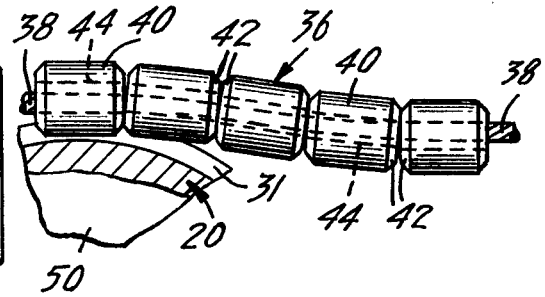

ARTICLE TRANSPORT SYSTEM

This is a continuation of application Ser. No. 622,092, filed Oct. 14, 1975, now abandoned.

BACKGROUND OF THE INVENTION

Systems for rotating articles while they are being transported are, of course, well known in the art, and are widely used in industry. As a specific example, in the manufacture of cans, such systems are employed to rotate wet (e.g., recently printed, coated or decorated) can bodies while carrying them through the drying ovens, to promote uniform curing. Conventionally, such a system employs a rigid rail, which is mounted at a fixed location adjacent the conveyor. The can holders are rotatably supported on the conveyor, and are positioned to contact and engage the rail during transport thereby, thus causing rotation of the holder about its mounting pin. While satisfactory in many instances, structural variations, dimensional and positional changes caused by wear, expansion, and the like, and other factors tend to make the prior systems unsatisfactory where uniform rotation of the conveyed objects is important, such as in the ultraviolet light curing techniques now being employed in connection with can printing and decorating operations.

Accordingly, it is an object of the present invention to provide a novel system for effecting the uniform rotation of conveyed articles.

It is also an object of the invention to provide such a system which is especially adapted for use in connection with the UV-curing of can bodies and, in particular, shells for two-piece cans.

Another object is to provide such a system which is simple, durable, dependable, and inexpensive to construct.

SUMMARY OF THE INVENTION

It has now been found that the foregoing and related objects of the invention are readily attained in an article transport system which includes a conveyor for moving a plurality of articles along a travel path, a plurality of article holders rotatably mounted at spaced locations on the conveyor, each having pulley portion disposed to rotate about a generally horizontal axis, and a rail assembly. The rail assembly is comprised of a series of axially-aligned, generally cylindrical members, with means for connecting the members adjacent to one another, while permitting relatively independent movement therebetween, at least in a vertical direction. The rail assembly is mounted to extend along at least a portion of the travel path of the conveyor, and is disposed to rest upon and ride within the pulley portions of the holders as they are moved therepast by the conveyor, whereby the resultant frictional engagement effects rotation of the holders.

In the preferred embodiments, the connecting means is a nonrigidly-supported flexible cable, and each of the cylindrical members has an axial bore through which the cable extends to serially mount them thereon; generally, both the cable and also the cylindrical members will be fabricated from a metal, such as steel. The ends of the cylindrical members are desirably of reduced dimensions, to promote the independent movement of the members, and this is readily achieved by tapering such portions. The cable should have a diameter less than that of the bores of the cylindrical members, to further promote the desired independent movement. The holders may be adapted to support, in axial alignment with the pulley portions thereof, a generally cylindrical hollow article having an open end, such as the shell for a two-piece can.

BRIEF DESCRIPTION OF THE DRAWINGS

FIG. 1 is a fragmentary, front elevational view of a system embodying the present invention, with portions of one of the holders and of the can shell mounted thereon broken away to show the relationship between the rail and the pulley portion of the holder;

FIG. 2 is a cross-sectional view taken along line 2—2 of FIG. 1, drawn to an enlarged scale and having parts of the holder and the can shell broken away to illustrate internal construction; and FIG. 3 is a fragmentary elevational view of portions of the flexible rail, drawn to a scale further enlarged from that of FIG. 2, and also showing a portion of the holder.

DETAILED DESCRIPTION OF THE ILLUSTRATED EMBODIMENT

Turning now in detail to the appended drawing, therein illustrated is a system embodying the present invention, and including a conveyor, generally designated by the numeral 12. The conveyor 12 comprises an endless chain 14 (only a portion of which is shown), mounted for movement along a generally horizontal travel path and supported from above and below by a pair of track members 16, 18. As will be appreciated, the chain 14 is driven by suitable means (not shown).

A multiplicity of can holders, each being generally designated by the numeral 20, are mounted at spaced intervals on the chain 14. As can be seen most clearly in FIG. 2, each holder 20 includes a generally circular base 22 having an axial bore 24 therethrough, in which is received a support pin 26 which, in turn, is secured to the chain 14 by an appropriate mounting fixture 28. The base 22 also has a pulley portion 30 with a U-shaped circumferential groove 31 extending thereabout, and a short, generally conical wall 32 extending outwardly therefrom. A plurality of outwardly-extending spring fingers 34 are affixed to the base 22, and cooperate with the wall 32 to support and securely mount a can shell 50 on the holder 20.

The pulley portions 30 of the holders 20 are designed to frictionally engage a rail assembly, generally designated by the numeral 36, which is suspended (by means not shown) above the can holders 20 and disposed along the travel path thereof. The assembly 36 consists of a flexible wire cable 38, on which are serially mounted a multiplicity of generally cylindrical metal sleeves or beads 40 having tapered end portions 42 and axial bores 44 extending through them. The assembly 36 rests upon and rides within the grooves 31 of the pulley portions 30 of the holders 20.

More particularly, the rail assembly 36 is effectively draped over the holders 20 and, because of its weight and flexibility, sags slightly between adjacent ones thereof. This condition is best shown in FIG. 3 (exaggerated for purposed of illustration), and it ensures that intimate contact is maintained between the rail assembly 36 and the pulley portions 30, and thus that the holders 20 will rotate at a uniform rate during conveyance past the assembly 36. Flexiblity is achieved in the rail assembly 36 by virtue of the inherent flexibility of the cable 38, and of the design of the beads 40 which, because of their relatively large diameter bores 44 and their tapered end portions 42, are capable of axial, transverse, and angular displacement on the cable 38.

Although the illustrated construction is preferred, it should be appreciated that the requisite flexibility can be afforded solely by the ability of the beads to move with respect to one another, with the member supporting them being relatively rigid. It is only essential that the beads ride on, and be supported by, the pulley portions, and the structure enabling the achievement of that relationship may vary within the broad concept of the invention. Such a relationship enables the rail to compensate for the variations and changes mentioned hereinbefore, thereby ensuring that intimate contact is maintained with the holders. Perhaps it should also be mentioned that the rail as well as the holders might be moved, in which case movement would be in opposite directions; this would enable can rotation at the highest possible speeds, within a limited distance and at practical rail and holder speeds.

The material from which the cable and beads will be fabricated may vary considerably, with the environment in which the system is to be employed often representing a primary consideration in the choice. Since, in UV curing ovens, the elements are subjected to infrared heating and may thereby be brought to temperatures in the order of 500° F or higher, it will generally be desirable to fabricate the elements of the system from metal and, in particular, from steel.

Thus, it can be seen that the present invention provides a novel system for effecting the efficient transport and uniform rotation of a conveyed article. The system is simple, durable, dependable and inexpensive to construct, and is especially suited for use in connection with the UV-curing of can shells.

What is claimed is:

1. An article transport system comprising: a conveyor for moving a plurality of hollow cylindrical articles along a travel path for subjection of said articles to irradiation, said conveyor including a plurality of holders for said articles rotatably mounted at spaced locations on said conveyor, each of said holders having a pulley portion associated therewith and disposed to rotate about a generally horizontal axis; and a rail assembly comprised of a series of axially-aligned, generally cylindrical members, the axial dimension of each said member being less than the recited spacing between said holders, and means supporting said members in mutually abutting relationship while permitting independent movements of adjacent ones thereof relative to said supporting means in a substantially vertical direction, said rail assembly being mounted to extend along at least a portion of said travel path of said conveyor, and with said cylindrical members disposed above the recited horizontal axis and effective to undergo the recited independent movements while resting upon and riding within said pulley portions as said holders are moved therepast by said conveyor, said cylindrical members frictionally engaging said pulley portions to effect uniform rotation of said holders as they are moved by said conveyor along said travel path for irradiation of said articles.

2. The system of claim 1 wherein said supporting means comprises a flexible cable suspended over said pulley portions, and wherein each of said cylindrical members has an axial bore through which said cable extends to serially mount said members thereon, said cable having a diameter less than the diameters of said bores, to promote said independent movement of said cylindrical members.

3. The system of claim 2 wherein the ends of said cylindrical members are tapered, further to promote said independent movements thereof.

* * * * *